(12) United States Patent
Umberger et al.

(10) Patent No.: US 6,957,433 B2
(45) Date of Patent: Oct. 18, 2005

(54) SYSTEM AND METHOD FOR ADAPTIVE PERFORMANCE OPTIMIZATION OF DATA PROCESSING SYSTEMS

(75) Inventors: David K. Umberger, Boise, ID (US);
Jonathan E. Condel, Boise, ID (US);
Brian L. Patterson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 09/757,269

(22) Filed: Jan. 8, 2001

(65) Prior Publication Data

US 2002/0091746 A1 Jul. 11, 2002

(51) Int. Cl.[7] ............................................... G06F 9/46
(52) U.S. Cl. ........................ 718/103; 718/100; 718/102
(58) Field of Search ................................. 718/100, 102, 718/103, 107; 709/229; 710/5; 714/6

(56) References Cited

U.S. PATENT DOCUMENTS

| 6,012,123 A | * | 1/2000 | Pecone et al. ............. 711/114 |
| 6,157,963 A | * | 12/2000 | Courtright et al. ............. 710/5 |
| 6,516,425 B1 | * | 2/2003 | Belhadj et al. ................. 714/6 |
| 6,557,039 B1 | * | 4/2003 | Leong et al. ............... 709/229 |
| 6,578,064 B1 | * | 6/2003 | Saito et al. .................. 718/103 |
| 6,598,174 B1 | * | 7/2003 | Parks et al. .................... 714/6 |
| 6,721,490 B1 | * | 4/2004 | Yao et al. ..................... 386/69 |

* cited by examiner

*Primary Examiner*—Majid Banankhah

(57) ABSTRACT

The present invention relates to a system and method for allocating and forecasting computational effort from a plurality of service components among a plurality of workloads. Preferably, processing power or other computational service is allocated among the workloads or tasks so as to optimize overall system efficiency and avoid processing bottlenecks. The inventive mechanism may be advantageously applied to the migration or movement of data between different levels of a hierarchical RAID storage system, between various storage systems, and/or between a storage system and a host device of a data processing system.

17 Claims, 5 Drawing Sheets

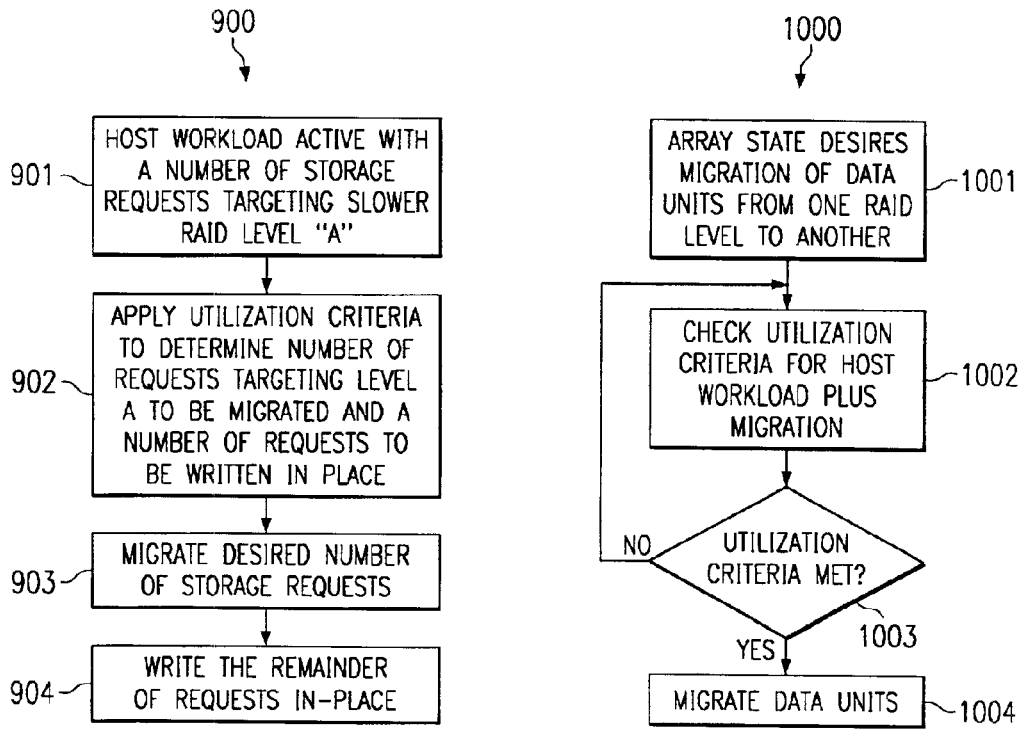
FIG. 9
FIG. 10
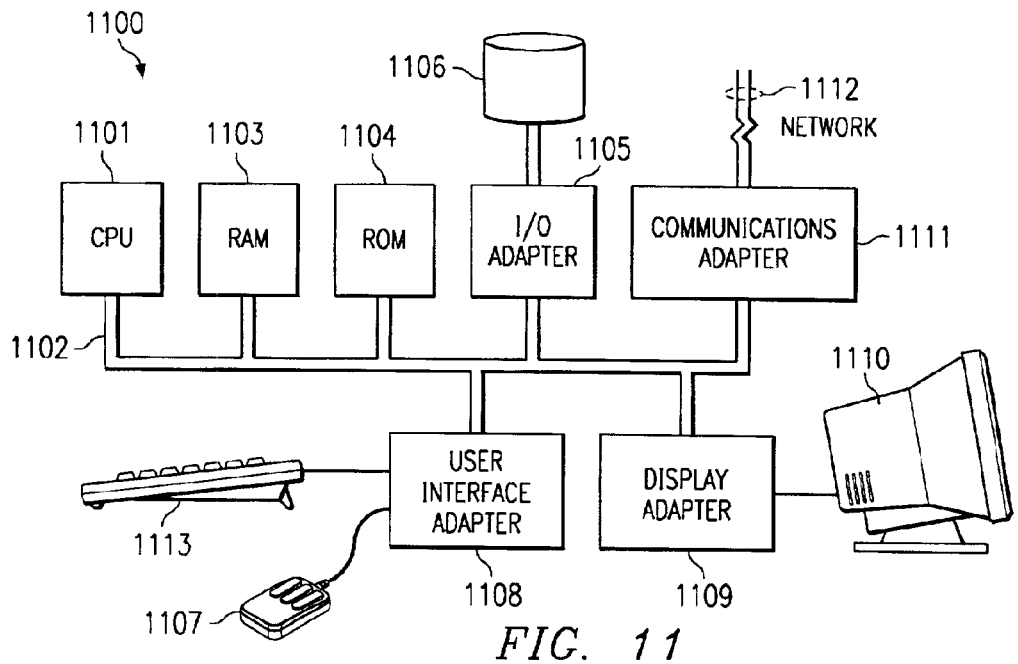
FIG. 11

SYSTEM AND METHOD FOR ADAPTIVE PERFORMANCE OPTIMIZATION OF DATA PROCESSING SYSTEMS

RELATED APPLICATIONS

The present application is related to and commonly assigned U.S. Pat. No. 6,647,514, entitled "IMPROVING HOST I/O PERFORMANCE AND AVAILABILITY OF A STORAGE ARRAY DURING REBUILD BY PRIORITIZING I/O REQUESTS," filed Mar. 23, 2000; U.S. application Ser. No. 09/680,542, entitled "METHOD FOR TIMELY DATA MIGRATION IN A REDUNDANT HIERARCHIC DATA STORAGE SYSTEM", filed Oct. 4, 2000, now abandoned; U.S. Pat. No. 5,392,244, entitled "MEMORY SYSTEMS WITH DATA STORAGE REDUNDANCY MANAGEMENT," issued Feb. 21, 1995; and U.S. Pat. No. 5,542,065, entitled "METHODS FOR USING NON-CONTIGUOUSLY RESERVED STORAGE SPACE FOR DATA MIGRATION IN A REDUNDANT HIERARCHIC DATA STORAGE SYSTEM," issued Jul. 30, 1996, the disclosures of which are hereby incorporated herein by reference.

TECHNICAL FIELD

The present invention relates to allocating tasks to a plurality of processing components and in particular to allocating processing power in a data storage system.

BACKGROUND

In computing environments, a number of different devices generally cooperate in order to accomplish a plurality of tasks, the result of which is that some devices or service components within a system may operate closer to their operating capacity than others, possibly resulting in the creation of processing bottlenecks. It is generally desirable to optimally allocate processing power available at each of the devices in such a system among a set of tasks to be accomplished, particularly at the devices most likely to experience data traffic or computing bottlenecks. The systems in which such problems arise include data storage systems, telecommunication systems, and distributed data processing systems of various kinds.

In the prior art, service provided by various service components may be distributed among a plurality of tasks by first assigning priority levels to each of the plurality of tasks and then employing a prioritization algorithm, such as time sharing, to determine the distribution of service among the plurality of tasks according to the various priority levels.

In the case of hierarchic data storage systems, data may be stored at various levels having varying levels of data storage and retrieval speed and efficiency. Where the priority rules for deciding which levels of a storage hierarchy different data will be stored in are fixed in advance according to properties of the data which are known in advance, the data storage system will generally be unable to optimize its performance effectively at run time. Thus, if a data processing application yields a situation in which frequently accessed data is stored in a less rapidly accessible portion of a hierarchic data storage system, the systems of the prior art will generally continue to access such inefficiently stored data without modification at run time. Accordingly, a processing bottleneck could occur as a consequence of fixing processing priorities prior to beginning program execution.

Accordingly, it is a problem in the art that because prior art systems generally do not take account of the consumption of processing resources within a distributed processing system, the processing system is generally unable to respond in real time to changes in the workloads which are imposed upon various system components at run time.

SUMMARY OF THE INVENTION

The present invention is directed to a system and method which dynamically allocates processing power available at a plurality of system components among a plurality of tasks or workloads at run-time. The inventive mechanism preferably adaptively responds to indexes of utilization of various system components at run time to allocate work requests to system components which have the most available unused computational (or other data processing activity) capacity at any particular point in time. Moreover, the inventive mechanism is preferably able to determine the total amount of work incident upon a computing system.

Preferably, performing such allocation continuously operates to prevent bottlenecks and achieve an optimal distribution of computing responsibility among a group of system components or computing entities. A utilization rate is one index of a degree of occupation of a system component or computing entity which may be useful in determining an allocation of tasks among computing entities. However, it will be appreciated that other indexes of a degree of occupation of a system may be employed, such as, for instance, mean waiting time for work requests in a queue awaiting execution, and the total time elapsed between issuance of a request for execution of a work request and completion of execution of the work request, etc . . . , and all such variations are included within the scope of the present invention.

In a preferred embodiment, computing entities within a data processing system may differ both in the type of processing they do as well as in a current utilization rate for each entity. When multiple workloads are incident upon the system, the inventive mechanism is preferably able to decompose the workloads into various processing or operational types so that the tasks within the workloads may be optimally allocated among the various computing entities. Preferably, the decomposition of a workload into various operational types may be performed prior to beginning execution of work requests within a workload so that the utilization rates of various computing entities within the data processing system may be effectively predicted prior to initiating actual execution of the work requests.

Moreover, the inventive mechanism preferably acquires detailed information about workloads including statistical information which aids in more accurately predicting which portions of a computer system will be burdened by a particular workload and to what extent each portion will be burdened. The ability to adjust allocation priorities in real time, during program execution, preferably provides the inventive mechanism with the ability to flexibly adapt to changing execution requirements by forecasting service component utilization rates.

In a preferred embodiment, the inventive mechanism is able to perform two basic forms of prediction or forecasting with respect to the effect of work requests on service components. A first form is generally employed to predict the effect of adding one or more service requests upon the utilization rates of service components made responsible for acting upon the added work requests.

The present invention is preferably also able to employ forecasting or prediction to determine future utilization rates of components based upon a combination of past and present system parameters such as utilization rates. Such future forecasting may be accomplished by methods including but not limited to linear extrapolation, nonlinear time series forecasting methods, and auto-regression. Thus, the inventive mechanism may operate to detect trends in resource utilization based on present and past system operation and thereby generate forewarning of problematic conditions such as, for instance, an excessively high utilization rate of one or more service components.

Although the present invention may be applied to a wide array of computing operations and environments, one effective area of application is that of storage systems in general and hierarchical storage systems in particular. In moving data between various components of a complex storage system, numerous different tasks are generally involved. Accordingly, the priority setting and task allocation mechanism of the present invention may be productively employed to optimally distribute data storage activity among the various components of a storage system in order to achieve optimal system efficiency. In addition to being able to establish priority levels for various tasks, the inventive mechanism is preferably able to determine whether a particular task, such as an internally generated management task, should be executed at all.

Accordingly, it is an advantage of a preferred embodiment of the present invention that the inventive mechanism may allocate execution tasks based on detailed characteristics of a workload rather than upon gross macroscopic properties.

It is a further advantage of a preferred embodiment of the present invention that the inventive dynamic task allocation mechanism may be applied to management of data within a storage system.

It is still a further advantage of a preferred embodiment of the present invention that processing and communication bottlenecks may be relieved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 9 depicts a sequence of steps for employing utilization criteria to move data between different levels in a hierarchical data storage system according to a preferred embodiment of the present invention;

FIG. 10 depicts a sequence of steps for deciding upon a migration of data between different levels of a hierarchical data storage system according to a preferred embodiment of the present invention; and FIG. 11 depicts computer apparatus adaptable for use with a preferred embodiment of the present invention.

DETAILED DESCRIPTION

Figure 1:
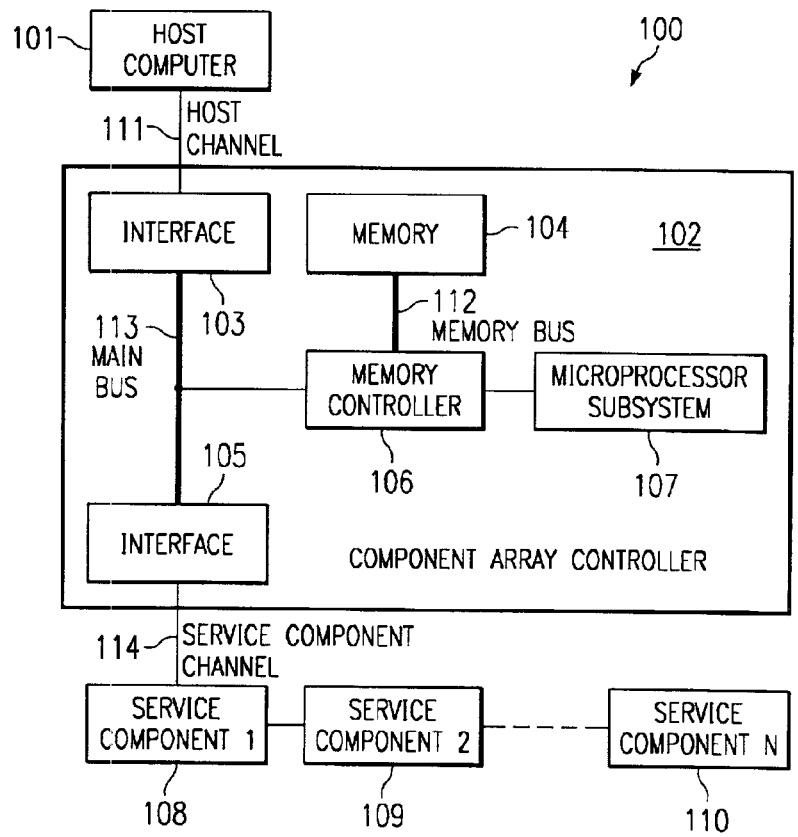
FIG. 1 is a block diagram illustrating a storage system connected to a host computer according to a preferred embodiment of the present invention.

FIG. 1 is a block diagram illustrating a storage system connected to a host computer according to a preferred embodiment of the present invention.

In a preferred embodiment, storage system 100 is composed of a host channel 111, which is generally a cable that connects to host computer 101 through which data and requests for data flow. Host channel 111 is preferably connected to component array controller 102 which has an interface 103 to host channel 111. Interface 103 is preferably connected to main bus 113 which is in turn preferably connected to memory controller 106. Memory controller 106 preferably controls memory 104 via memory bus 112. Memory controller 106 is preferably connected to both memory 104 and micro-processor subsystem 107. Moreover, memory controller 106 is preferably connected via main bus 113 BUS to a second interface 105 which leads in turn to service component channel 114. It will be appreciated that host computer 101 may be a single computer or a plurality of computers connected by a switch or hub.

Generally, a request for data will flow from host computer 101 to interface 103, and will be placed in memory 104 by memory controller 106. The, microprocessor subsystem or processor 107 will preferably receive an interrupt and then obtain the request and details about the request from memory 104. If the request is for an output operation, processor 107 will preferably cooperate with memory controller 106 to transmit a service component request to an appropriately selected service component among service components 108–110. For the rest of this discussion it will be assumed that service component 2 109 is the destination of the service component request from processor 107.

The service component request is then preferably transmitted along service component channel 114 to service component 2 109. Service component 2 109 then preferably obtains the requested data and transmits this data along service component channel 114 to memory controller 106 and on to memory 104. Next, once processor 107 is notified that data is now present in memory, processor 107 preferably executes instructions to arrange for transmission of the retrieved data from memory 104 to memory controller 106 along main bus 113 through interface 103 to host computer 101, thereby completing a read operation.

Generally, internal work requests may be generated based on a system's internal state. Component array controller 102 preferably includes means for identifying failed or otherwise non-optimal components and service components, as well as other system state information, and these states can generate work requests.

In a preferred embodiment, service components 108–110 are each hard disk drives and a sequence of such hard disk drives forms a disk array. It may be seen that an essentially unlimited number of service components may be included in the embodiment of FIG. 1. Where the service components are disk drives, component array controller 102 would be a disk array controller and service component channel 114 would be a disk channel for communication of data and control information to and from disks in the disk array. However, it will be appreciated that many other data processing components would benefit from implementation of the inventive task allocation mechanism. Moreover, although service components 108–110 are preferably disk drives in the exemplary embodiment of FIG. 1, service components 108-110 could represent a range of other computing and/or communication devices and still benefit from application of the inventive task allocation system, and all such variations are included within the scope of the present invention.

Figure 2:
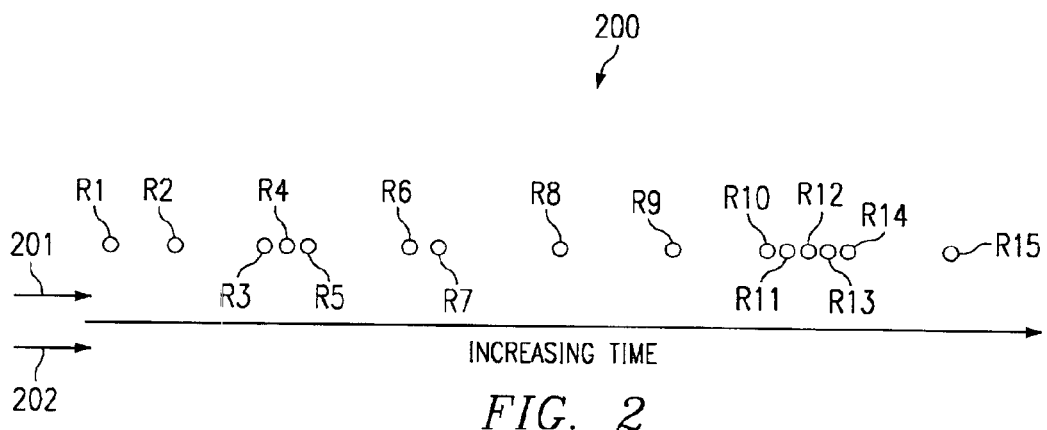
FIG. 2 depicts the arrival of work requests for an exemplary workload at a data processing system according to a preferred embodiment of the present invention.

FIG. 2 depicts the arrival of work requests 201 for an exemplary workload at a data processing system according to a preferred embodiment of the present invention.

Herein, the term "workload" generally refers to a time ordered sequence of work requests presented for executed to a computer system or data processing system, and the term "work request" generally refers to a computational task, forming a subset of a workload, representing a finite imposition of computational effort on one or more types of service component within a data processing system. Herein the term "service component" generally refers to component of a data processing system able to do work associated with a work request. The term "service component" may include but is not limited to storage components such as disk drives, and processing components such as microprocessors. Herein, the term "service demand" generally refers to an amount of service demanded of one or more service components for a work request or workload, and the term "utilization rate," as applied to a service component, generally refers to a ratio of time spent processing to total chronological time. Thus, by way of example, if within a 5.0 second period, a particular service component spends 4.0 seconds processing work requests or performing other operations, and spends 1.0 seconds idle, the utilization rate for this component during this 5.0 second period would be 4.0/5.0=0.8.

Generally, each work request may employ the resources of more than one service component within a data processing system. In FIG. 2, works requests R1–R15 201 represent fifteen separate consecutive work requests which are presented for execution to a data processing system.

Generally, each work request will consume some amount of service from each service component of a data processing system, which may be a storage system. Work requests 201 may be of different "types" meaning that the type of processing needed to service each such work request will vary. For each type of request, the amount of service that a particular service component will provide is generally governed by some fixed probability distribution. Properties of such distributions in combination with the rate at which a workload's work requests arrive at a data processing system may be used to estimate utilization rates of the system's service components resulting from execution of work requests within a particular workload.

Figure 3:
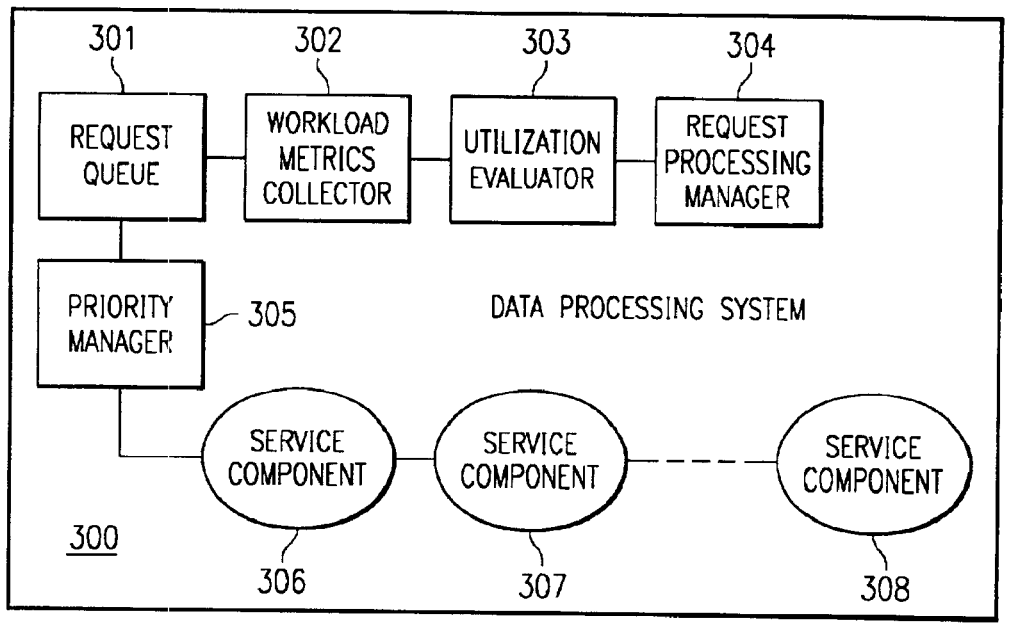
FIG. 3 depicts a data processing system for processing work requests according to a preferred embodiment of the present invention.

FIG. 3 depicts a data processing system 300 for processing work requests according to a preferred embodiment of the present invention.

In a preferred embodiment, data processing system 300 is composed of a set of service components 306–308 which preferably process work requests. Data processing system 300 preferably also contains request queue 301 in which incoming work requests are initially placed. Preferably, workload metrics collector 302 accumulates statistics relating to computational demands of work requests placed in request queue 301. Employing both statistics accumulated in workload metrics collector 302 and operational properties of service components 306–308, utilization evaluator 303 preferably calculates utilization rates of service components relevant to execution of the queued work requests.

In a preferred embodiment, priority manager 305 ranks the relative priority of queued or pending work requests in request queue 301. In a limited mode of operation, priority manager 305 may be limited to merely identifying established priority levels of various work requests. Alternatively, priority manager 305 may operate to dynamically adjust the priority of requests in request queue 301 based either upon externally provided criteria or upon one or more aspects of data processing system 300.

In a preferred embodiment, request processing manager 304 selects the manner in which work requests in request queue 301 will be processed. Request processing manager 304 preferably cooperates with utilization evaluator 303 and priority manager 305 to decide the manner of processing work requests. Preferably, request processing manager 304 employs utilization rates, internal system state information, and information from the priority manager to determine the manner of processing work requests. Generally, the manner of processing work requests includes determining the order in which work requests will be processed, the amount of work to process, and/or what if any work should be suppressed.

In an alternative embodiment, workload metrics collection unit, utilization evaluator 303 and/or request processing manager 304 could be included within request processing manager 304.

It will be appreciated that embodiment of FIG. 3 is exemplary. Operational components 302–305 could be located in a system other than that containing service components 306–308. Moreover, the function of operational components 302–305 could performed by software executed by a processor located on a system which is a source of the work requests or within a service component of data processing system 300, such as, for instance, as processor core, input/output device, communication port, or storage system. In yet another alternative embodiment, the functions of elements 301 through 305 could be performed by separate dedicated hardware components.

Figure 4:
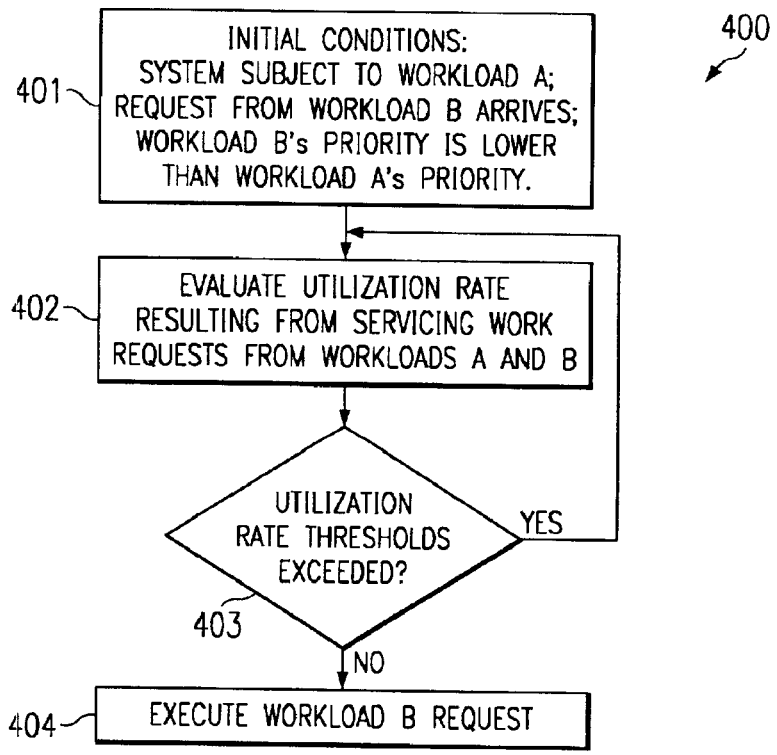
FIG. 4 depicts a flowchart for identifying the relative priority of work requests from two separate workloads according to a preferred embodiment of the present invention.

FIG. 4 depicts a flowchart 400 for identifying the relative priority of work requests from two separate workloads according to a preferred embodiment of the present invention. It will be appreciated that the method applied to the workloads discussed herein could be extended to a number of workloads greater than two and that all such variations are included within the scope of the present invention. Reference may be made to both FIGS. 3 and 4 in connection with the following discussion.

In a preferred embodiment, a set of initial conditions is present at processing manager 304 (FIG. 3). These initial conditions 401 may include the following: a data processing system is currently subject to, or responsible for executing work requests for, workload A (a first or initial workload), the system is in receipt of a request to process a work request from workload B, and the priority of workload B is lower than that of workload A.

Generally, there may or may or may not be any work requests from workload A in the request queue. If there are no work requests from A in the request queue 301, the work request from B will preferably be processed immediately. If the work request from workload B is processed immediately, and the work request from B imposes a considerable computational burden on the system, or has a high "service demand," then work requests from workload A after execution of the work request from workload B begins will generally not be serviced until B's request is satisfied. Such a preference system could lead to unacceptable performance for work requests from workload A.

In a preferred embodiment, workload metrics collector 302 collects data concerning workload A's work requests. The service demands of prior work requests from workload A may generally be determined from such collected data. Preferably, utilization evaluator 303 can use this collected data together with data regarding the service demands of work requests from workload B to forecast a utilization rate for service components, within data processing system 300, arising from work requests within workloads A and B in step 402. Preferably, information within this forecasted utilization rate employing this overall utilization rate accurately reflects the effect of executing work requests from workload B on the execution of workload A. Based on the extent of this determined effect, processing manager 304 is preferably able to decide if the detriment to the execution efficiency of workload A is too large, in step 403. If the performance detriment is not too large, as indicated by the utilization rate, then work requests from workload B are preferably performed in conjunction with any new requests from workload A, as indicated in step 404. Generally, surpassing a previously established utilization rate threshold for components within data processing system 300 is indicative of the processing detriment on workload A caused by processing work requests from workload B being too large.

In addition to forecasting the effects of executing workload B on the execution of workload A, the inventive mechanism may forecast or predict future utilization rates of the service components. The forecasting of future utilization rates may be accomplished by employing information representing the utilization rate history of the pertinent service components prior to the execution of workloads A and B in combination with the utilization rates resulting from execution of workloads A and B. It may be seen that this approach enables utilization rate information from execution of each succeeding workload to be employed to generate revised forecasted utilization rates for various service components, thereby providing continuously updated forecasted utilization rates based on the most recent available data.

In a preferred embodiment, priority manager 305 may operate to adjust the priority levels of workloads A and B in order to apportion processing time among the two workloads. For example, where there is an indication that workload B's work requests are not receiving sufficient attention, priority manager 305 may operate to increase workload B's priority with respect to that of workload A in order to cause more processing activity within system 300 to be committed to workload B.

In a preferred embodiment, utilization evaluator 303 may employ a number of methods to forecast utilization rates of data processing system 300 based on the workload metrics collected by workload metrics collector 302. For example, utilization evaluator 303 may combine workload metrics pertaining to workload A (or other workload) accumulated over a period of time to determine trends in the workload metrics and thereby generate estimates of future demands placed upon system 300 by workload A.

It will be appreciated that the mechanism for selecting work requests for execution from a competing group of workloads represents but one application of the inventive prioritization scheme. Preferably, the mechanism for optimally selecting an action from a plurality of choices may be applied to a number of operations beyond the execution of requests from a plurality of workloads. One area of application of the inventive prioritization scheme is in the movement and allocation of data among different storage schemes (such as, for instance, RAID (redundant array of independent disks) schemes within a single storage system as well as allocation of data among different storage systems, as described in the following figures.

Figure 5:
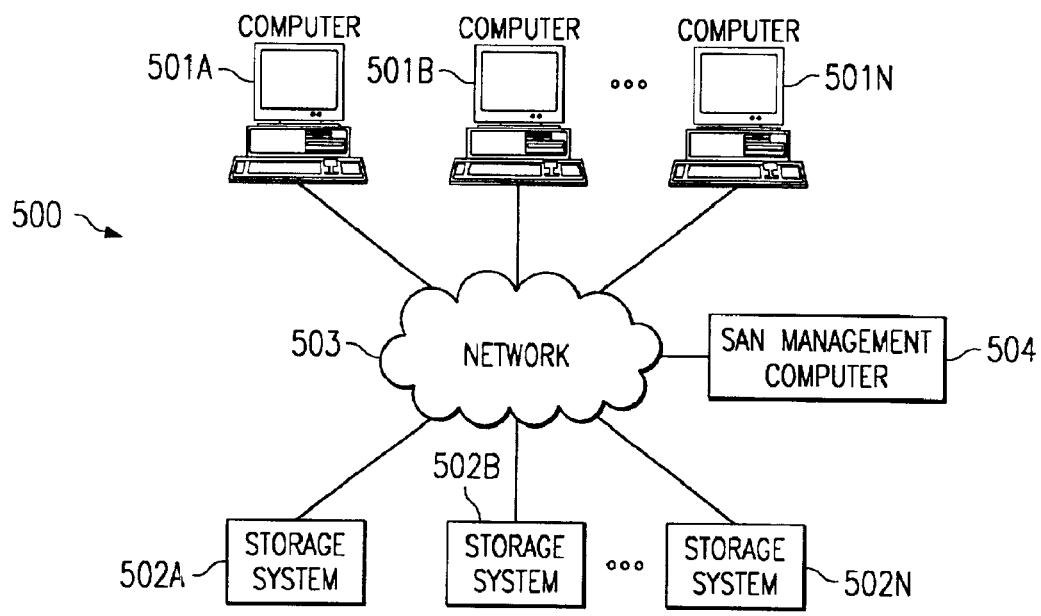
FIG. 5 is a block diagram of a storage area network adaptable for use with a preferred embodiment of the present invention.

FIG. 5 is a block diagram of a storage area network 500 adaptable for use with a preferred embodiment of the present invention. Storage area network 500 preferably includes a plurality of computers 501a–501n and a plurality of storage systems 502a–502n. Storage area network (SAN) management computer 504 preferably controls the movement of storage data among storage systems 502a–502n.

In a preferred embodiment, computers 501a–501n and storage systems 502a–502n may be separated by substantial distances and the user data may be distributed among a plurality of storage systems 502a–502n. In order to optimize the efficiency of data storage within storage systems 502a–502n, it may be beneficial to migrate data between the various storage systems. However, such migrations generally utilize the same service components (such as, for instance, data storage arrays and network elements) as do input/output (I/O) operations conducted for purposes other than storage data migration, such as, for instance, user I/O or interaction with a host system. Such data migrations could be controlled, employing the SAN Management Computer 504, using the prioritization mechanism discussed in connection with FIG. 4. The selection of data to be migrated from one storage system to another may be based upon utilization rates of various storage systems within storage area network 504.

Figure 6:
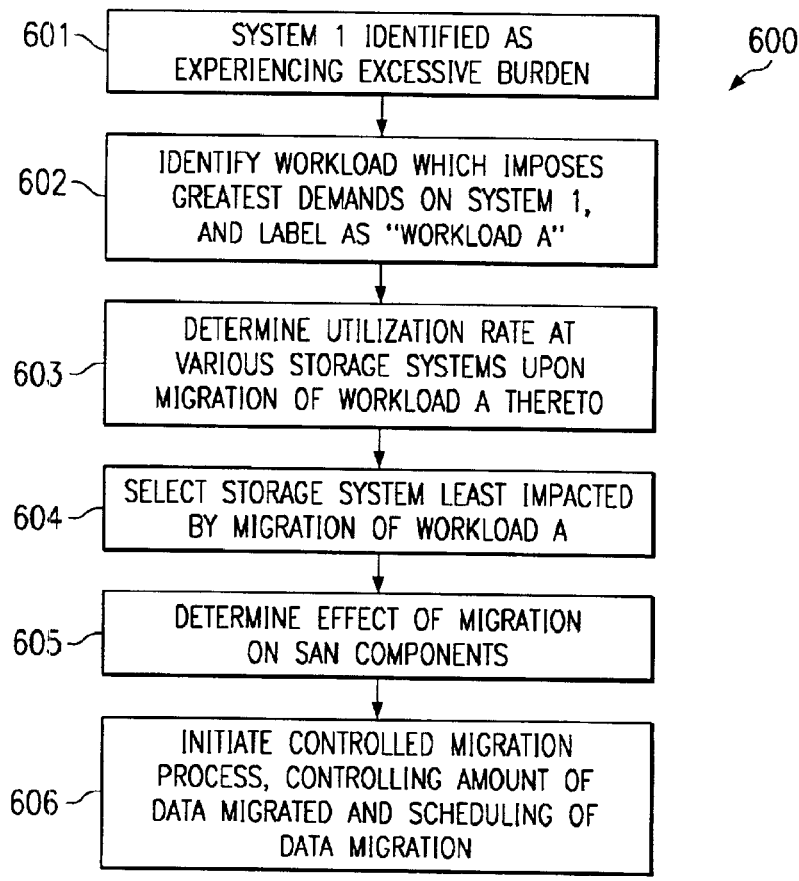
FIG. 6 depicts a flowchart of an adaptive scheme for migrating a workload and associated stored data between different storage systems according to a preferred embodiment of the present invention.

FIG. 6 depicts a flowchart 600 of a adaptive scheme for migrating a workload and associated stored data between different storage systems according to a preferred embodiment of the present invention.

Generally, the performance of a storage system may suffer if excessive demands are placed upon it. Performance characteristics for storage systems may include such features as the speed with which data may be stored and retrieved, and the amount of redundancy, and the attendant data storage security provided by such redundancy. Generally, a single storage system within a network of storage systems may service a plurality of workloads with each workload generally being associated with a logical storage unit (LUN).

In a preferred embodiment, workload metrics associated with the various workloads may be employed to determine which of the workloads may be imposing particularly high service demands on their respective storage systems. Preferably, the service demands placed on each of the storage systems within a storage area network may be determined to determine the utilization rates of each of the storage systems. The information on the utilization of each of the storage systems may be employed to advantageously migrate logical storage units and their associated workloads from heavily burdened storage systems, i.e. those with high utilization rates, to storage systems with lower utilization rates, thereby providing a more balanced operational burden on the various storage systems within a storage area network 500 and preferably providing for more efficient operation of the storage area network 500.

The flowchart of FIG. 6 depicts an exemplary sequence of steps for migrating a workload from one storage system to another within a storage area network. At step 601, storage system 1 is identified as having performance problems, or an excessive operational burden. At step 602, the inventive mechanism preferably identifies a workload operating at storage system 1 which imposes the greatest burden of any workload operational at storage system 1. For the sake of this discussion, this identified workload is labeled as "workload A." At this stage, the inventive mechanism preferably evaluates other storage systems within a storage area network such as storage area network 500 to which workload A could be effectively migrated or moved so as to better balance the operational burden among the various storage systems within storage area network 500.

Accordingly, at step 603, the inventive mechanism preferably determines utilization rates at a plurality of storage systems to which workload A could be migrated in order to select a storage system most suitable to receive a migration of workload A. At step 604, the inventive mechanism preferably selects and identifies the storage system most suitable for receiving a migration of workload A. The recipient storage system is generally referred to herein as storage system X. At step 605, the inventive mechanism preferably determines the effect of a migration of workload A on the SAN components. At step 606, a process of migration of workload A from storage system 1 to storage system X is preferably initiated. This migration process is preferably implemented while controlling both the amount of data to be migrated as well as the scheduling of data migration.

Figure 7:
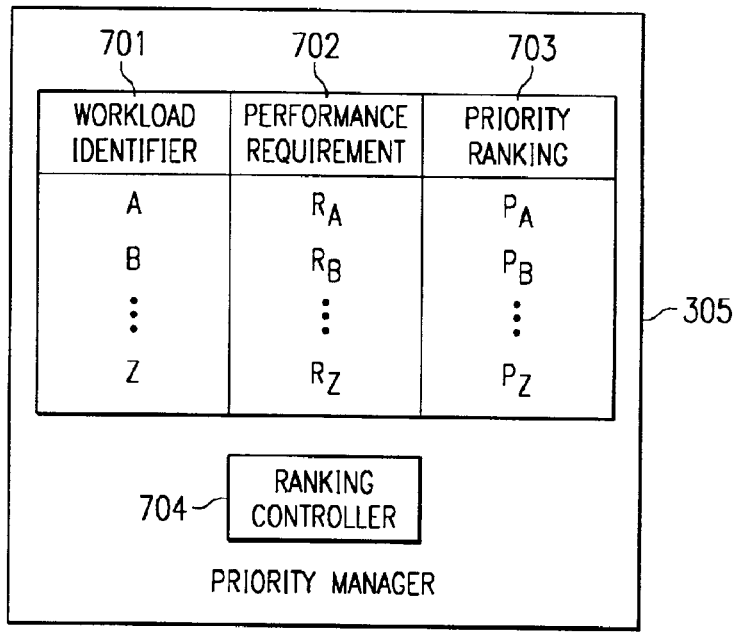
FIG. 7 depicts a priority manager for controlling workloads based on performance requirements according to a preferred embodiment of the present invention.

FIG. 7 depicts a priority manager for controlling workloads based on performance requirements according to a preferred embodiment of the present invention. FIG. 7 presents a more detailed depiction of priority manager 305 previously discussed in connection with FIG. 3. Reference is made to both FIG. 7 and FIG. 3 in connection with the following discussion.

In a preferred embodiment, priority manager 305 includes a data structure that connects each distinguishable workload or workload identifier 701 with a performance requirement 702 and a dynamic priority ranking 703. Ranking controller 704 preferably operates to appropriately modify the priority ranking 703 of selected workloads as circumstances warrant.

In a preferred embodiment, a user or other agent may assign initial priority rankings 703 to workloads directly in terms of the workloads' performance requirements. Then, through the use of individual workload metrics, the initially assigned priority rankings may be dynamically altered by ranking controller 704 at run time based upon a current state of the data processing system in which priority manager 305 operates. Generally, the performance requirements of all the workloads presented for execution may be serviced by the data processing system 300 (FIG. 3).

Generally, performance requirements 702 associated with each workload identifier 701 represent the minimum performance level preferred for each workload. Therefore, a workload may be given more service than indicated by workload requirement 702, but it should not be given any less than that indicated by workload requirement 702, as embodied in the service level guarantees for workload 702. The expression "service level guarantee" as applied to a particular workload generally refers to a minimum level of service to maintained for that workload.

If a particular workload is being given less service, or computational effort, than that indicated by its minimum performance requirement, as defined by its performance requirements 702, then, its priority ranking may be raised, or a conflicting workload's priority ranking may be lowered. Request processing manager 304 preferably processes requests in the request queue 301 according to priority ranking 703, with workloads being processed in order of priority ranking.

Figure 8:
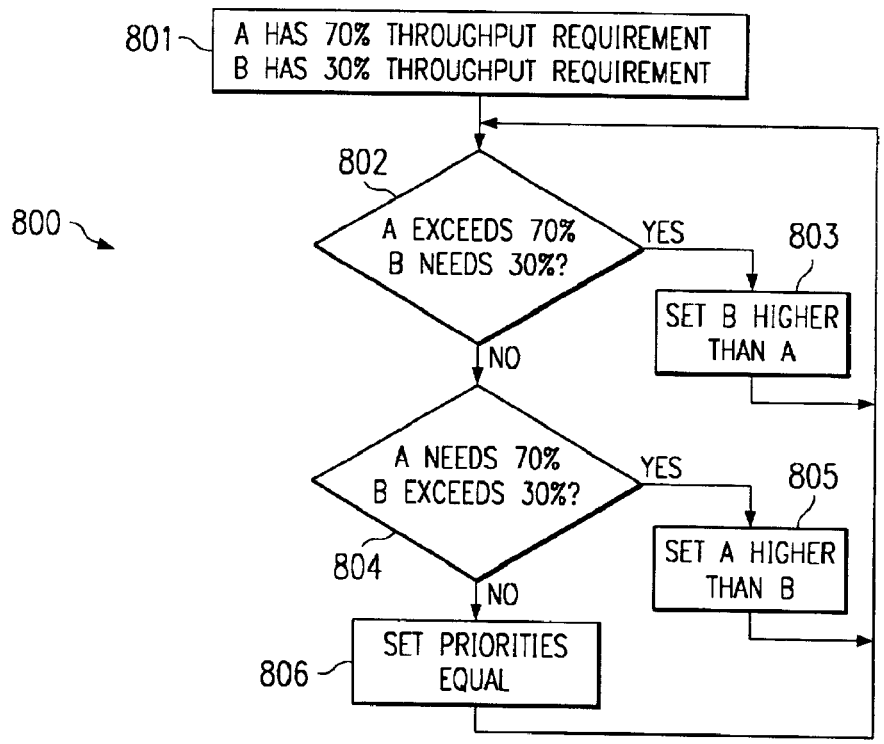
FIG. 8 depicts the operation of a scheme for adjusting the relative priority of priorities of two workloads according to a preferred embodiment of the present invention.

FIG. 8 depicts the operation of a scheme for adjusting the relative priority of priorities of two workloads according to a preferred embodiment of the present invention. Although the adjustment of relative priority is discussed in the context of two competing workloads, it will be appreciated that the mechanism for priority adjustment described herein may be applied to a number of competing workloads greater than two, and all such variations are included within the scope of the present invention.

An example is considered wherein a priority for workload A is established by consequence of a service guarantee or performance requirement of 70%, wherein the 70% value refers to the percentage of the available processing power or other form of computational service provided by a service element, such as a processor or storage system. In similar manner, workload B has its performance requirement set at 30%, as indicated in step 801.

Continuing with the example, if decision triangle 802 yields a condition in which workload A demands a service level in excess of 70% while workload B continues to require 30%, indicating that the "yes" logical branch is followed, ranking controller 704 (FIG. 7) preferably establishes workload B's ranking priority higher than that of workload A's in step 803.

Continuing with the example, following the "no" branch from decision triangle 802, to decision triangle 804, where decision triangle 804 yields a condition wherein workload B is using up more than its allotted share of 30% (of computational service) while workload A needs its 70% share, then ranking controller 704 (FIG. 7) will preferably establish workload A's priority above that of workload B's, in step 805. Generally, where the conflicts described above are not present, ranking controller 704 will generally provide the same ranking priority to workloads A and B, in step 806.

The following discussion of RAID techniques is supplied to provide a greater understanding of the matter discussed in connection with FIGS. 9 and 10.

Conventional disk array data storage systems have multiple storage disk drive devices that are arranged and coordinated to form a single mass storage system. The common design goals for mass storage systems include low cost per megabyte, high input/output performance, and high data availability. Data availability involves the ability to access data stored in the storage system while ensuring continued operation in the event of a disk or component failure. Data availability is often provided through the use of redundancy where data, or relationships among data, are stored in multiple locations in the storage system. In the event of disk failure, redundant data is retrieved from the operable portion of the system and used to regenerate the original data that is lost due to the component failure.

Generally, there are two methods for storing redundant data on disk drives: mirrored and parity. In mirrored redundancy, the data being stored is duplicated and stored in two separate areas of the storage system that are the same size (an original data storage area and a redundant storage area). In parity redundancy, the original data is stored in an original data storage area and the redundant data is stored in a redundant storage area, but because the redundant data is only parity data, the size of the redundant storage area is generally less than the size of the original data storage area, as illustrated in the situations presented below.

RAID (Redundant Array of Independent Disks) storage systems are disk array systems in which part of the physical storage capacity is used to store redundant data. RAID systems are typically characterized as one of seven architectures or levels, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirrored redundancy. Original data is stored on one set of disks and a duplicate copy of the data is kept on separate disks. The RAID 2 through RAID 6 architectures all involve parity-type redundant storage. Of particular interest, a RAID 5 architecture distributes data and parity information across all of the disks. Typically, the disks are divided into equally sized address areas referred to as "blocks." A set of blocks from each disk that has the same unit address ranges are referred to as "stripes." In RAID 5, each stripe has N blocks of data and one parity block which contains redundant information for the data in the N blocks.

In RAID 5, the parity block is cycled across different disks from stripe-to-stripe. For example, in a RAID 5 architecture having five disks, the parity block for the first stripe might be on the fifth disk; the parity block for the second stripe might be on the fourth disk; the parity block for the third stripe might be on the third disk; and so on. The parity block for succeeding stripes typically "precesses" around the disk drives in a helical pattern (although other patterns are possible). RAID 2 through RAID 4 architectures differ from RAID 5 in how they place the parity block on the disks.

A RAID 6 architecture is similar to RAID 4 and 5 in that data is striped, but is dissimilar in that it utilizes two independent and distinct parity values for the original data, referred to herein as P and Q. The P parity is commonly calculated using a bit by bit Exclusive OR function of corresponding data chunks in a stripe from all of the original data disks. This corresponds to a one equation, one unknown, sum of products calculation. On the other hand, the Q parity is calculated linearly independent of P and using a different algorithm for sum of products calculation. As a result, each parity value is calculated using an independent algorithm and each is stored on a separate disk. Consequently, a RAID 6 system can rebuild data (assuming rebuild space is available) even in the event of a failure of two separate disks in the stripe, whereas a RAID 5 system can rebuild data only in the event of no more than a single disk failure in the stripe.

Similar to RAID 5, a RAID 6 architecture distributes the two parity blocks across all of the data storage devices in the stripe. Thus, in a stripe of N+2 data storage devices, each stripe has N blocks of original data and two blocks of independent parity data. One of the blocks of parity data is stored in one of the N+2 data storage devices, and the other of the blocks of parity data is stored in another of the N+2 data storage devices. Similar to RAID 5, the parity blocks in RAID 6 are cycled across different disks from stripe-to-stripe. For example, in a RAID 6 system using five data storage devices in a given stripe, the parity blocks for the first stripe of blocks may be written to the fourth and fifth devices; the parity blocks for the second stripe of blocks may be written to the third and fourth devices; the parity blocks for the third stripe of blocks may be written to the second and third devices; etc. Typically, again, the location of the parity blocks for succeeding blocks shifts to the succeeding logical device in the stripe, although other patterns may be used.

A hierarchical data storage system permits data to be stored according to different techniques. In a hierarchical RAID system, data can be stored according to multiple RAID architectures, such as RAID 1 and RAID 5, to afford tradeoffs between the advantages and disadvantages of the redundancy techniques.

Additionally, a data storage system may permit data to be stored in multiple redundancy groups co-existing within the system. In a RAID system, each redundancy group is a set of disks in the RAID system that use the same RAID architecture (or RAID architectures for a hierarchical RAID system) to provide redundancy. By way of example, in a RAID system having a total of thirty disks, ten disks may be in the first redundancy group using one RAID architecture(s) (e.g., using RAID 1), another twelve disks may be in a second redundancy group using a second RAID architecture (s) (e.g., using RAID 1 and RAID 5), and the remaining eight disks may be in a third redundancy group using a third RAID architecture(s) (e.g., using RAID 1 and RAID 6).

U.S. Pat. No. 5,392,244 issued to Jacobson et al., entitled "Memory Systems with Data Storage Redundancy Management," describes a hierarchical RAID system that enables data to be migrated from one RAID type to another RAID type as data storage conditions and space demand change. This patent, which is assigned to Hewlett-Packard Company, describes a multi-level RAID architecture in which physical storage space is mapped into a RAID-level virtual storage space having mirrored and parity RAID areas (e.g., RAID 1 and RAID 5). The RAID-level virtual storage space is then mapped into an application-level virtual storage space, which presents the storage space to the user as one large contiguously addressable space. During operation, as user storage demands change at the application-level virtual space, data can be migrated between the mirrored and parity RAID areas at the RAID-level virtual space to accommodate the changes. For instance, data once stored according to mirrored redundancy may be shifted and stored using parity redundancy, or vice versa.

In the event that a disk in a RAID system fails the data in the array is "rebuilt," a process which typically involves issuing multiple read and/or write requests to the disk array. Typically, the RAID system is also available for read and write requests from a host computer during this rebuilding process. Unfortunately, these host requests often require access to the same resources as are used by the rebuild requests, and therefore compete with the rebuild requests.

In some systems, such competition between host requests and rebuild requests are resolved by either always delaying the host requests in favor of the rebuild requests (which can result in situations where the data in the storage array is rebuilt more quickly and the performance of the system in responding to host requests is diminished even though the storage array is not close to permanently losing data) or always delaying the rebuild requests in favor of the host requests (which can result in situations where the performance of the system in responding to host requests is not diminished, but rebuilding data in the storage array can take a very long time even though the storage array is close to permanently losing data). A storage array is close to permanently losing data when, for example, failure of one or more particular disk in the storage array would result in data loss.

FIG. 9 depicts a sequence of steps for employing utilization criteria to move data between different levels in a hierarchical data storage system. The workload prioritization schemes discussed elsewhere in this application may be applicable to migration of data between various levels of a hierarchical RAID data storage system.

In a preferred embodiment, some levels in a hierarchical RAID data storage system may deliver better I/O or data transfer performance than other levels. In this situation, a data transfer operation, either a read or write operation, may either be conducted "in place" or be combined with a migration of the data from a current RAID level to a more rapidly accessible RAID level. Generally, conducting a read or write operation "in place" generally refers to a conventional operation in which data to be read/written is read/written to/from a currently designated location within the RAID storage system in a conventional manner, without accompanying the read/write with a data migration. Where circumstances warrant, a read or write request may be coupled with a migration of the data to be read or written, and optionally data in a logically connected block of data within a current location within the RAID storage system, from a RAID location having slow data transfer access to one having more rapid data access. It will be appreciated that where a migration is performed, it is performed in addition to performance of the read or write operation. Accordingly, when pursued, the migration is generally performed in order to benefit subsequent read or write operations involving the migrated data.

In a preferred embodiment, a calculation for determining whether a migration would be beneficial or not would depend upon the size of the data quantity being read or written and upon the current utilization of the service component, in this case a hierarchical RAID storage system. Generally, the less busy the storage system is, and the smaller the data region being read or written, the more likely it is that migration will be coupled with a data access operation.

In a preferred embodiment, if data from a host computer is employed to update data already currently resident in a slow RAID level of a hierarchical RAID storage system, writing that data to the existing slow level location may have a different computational cost than writing it to a faster level of the RAID storage system. Where migrations of data stored within the hierarchical RAID storage system impose a greater computational cost than in-place operations, the number of data migrations which may be conducted without adversely impacting performance of external communication beyond a preestablished threshold may be calculated. In the above, "external communication" generally refers to communication between a storage system and another device, such as, for instance, a processor, or other storage system, as opposed to communication occurring entirely within a particular storage system.

In a preferred embodiment, a host system interacting with a RAID storage system presents an initial number of storage requests targeting a relatively slow RAID level within the RAID storage system, labeled A, in step 901. At step 902, the inventive mechanism preferably applies utilization criteria to determine, among the initial number of storage requests, what number will be migrated to other levels of the RAID storage hierarchy and a number of storage requests to be written in place. At step 902, the storage requests selected for migration are migrated, or moved, to selected destination storage levels within the hierarchical RAID storage system. And, at step 904, the storage requests not selected for migration to other levels of the RAID hierarchy are preferably written in place to storage level A.

FIG. 10 depicts a sequence of steps 1000 for deciding upon a migration of data between different levels of a hierarchical data storage system according to a preferred embodiment of the present invention. At step 1001, a condition is presented in which the state of a RAID storage system desires migration of data from one RAID level to another within a single RAID system. Such migration may be beneficial where rapid access is needed to data which is stored at a level which experiences relatively slow data I/O rates.

In a preferred embodiment, at step 1002, the inventive mechanism determines whether the current utilization rate of the RAID storage system for servicing both external interaction with a host device and for conducting internal data migration is at a level which would permit the data migration presented in step 1001 to occur. If the utilization rate is too high to permit the desired migration, as determined in decision block 1003, the inventive approach preferably returns to step 1002 to again check for an acceptable utilization rate. It may be seen that the method of FIG. 10 will loop through steps 1002 and 1003 until the utilization criteria query of step 1003 is satisfied. In a preferred embodiment, where utilization criteria 1003 are satisfied, the data for which migration was desired in step 1001 is migrated to a selected destination among the available levels in the hierarchical RAID storage system.

FIG. 11 illustrates computer system 1100 adaptable for use with a preferred embodiment of the present invention. Central processing unit (CPU) 1101 is coupled to system bus 1102. The CPU 1101 may be any general purpose CPU, such as an HP PA-8200. However, the present invention is not restricted by the architecture of CPU 1101 as long as CPU 1101 supports the inventive operations as described herein. Bus 1102 is coupled to random access memory (RAM) 1103, which may be SRAM, DRAM, or SDRAM. ROM 1104 is also coupled to bus 1102, which may be PROM, EPROM, or EEPROM. RAM 1103 and ROM 1104 hold user and system data and programs as is well known in the art.

The bus 1102 is also coupled to input/output (I/O) adapter 1105, communications adapter card 1111, user interface adapter 1108, and display adapter 1109. The I/O adapter 1105 connects to storage devices 1106, such as one or more of hard drive, CD drive, floppy disk drive, tape drive, to the computer system. Communications adapter 1111 is adapted to couple the computer system 1100 to a network 1112, which may be one or more of local (LAN), wide-area (WAN), Ethernet or Internet network. User interface adapter 1108 couples user input devices, such as keyboard 1113 and pointing device 1107, to the computer system 1100. The display adapter 1109 is driven by CPU 1101 to control the display on display device 1110.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture compositions of matter, means, methods, or steps.

What is claimed is:

1. A method for optimizing an efficiency of a data processing system, the method comprising:
   identifying a plurality of operations awaiting execution on at least one service component of said data processing system;
   assigning an initial priority ranking to each of said plurality of operations;
   dynamically modifying said assigned initial priority rankings to optimize said efficiency of said data processing system;
   determining a service demand placed upon each of the service components arising from performance of said plurality of operations; and
   estimating a utilization rate for each of the service components based on said determined service demands, wherein said dynamically modifying includes adjusting said assigned initial priority rankings to substantially equalize said utilization rates of the service components.

2. The method of claim 1 wherein said plurality of operations comprise an operation internal to said at least one service component and an operation external to said at least one service component, the method further comprising the step of:
   selecting one of the internal operation and the external operation for execution from said plurality of operations based on a utilization rate of said at least one service component.

3. The method of claim 2 wherein said selecting comprises:
   directing said at least one service component to execute said operations external to said at least one service component when said utilization rate is below a predetermined threshold.

4. The method of claim 3 wherein said directing comprises:
   adjusting priority rankings of said external operations so as to surpass priority rankings of said internal operations.

5. The method of claim 1 wherein one of said plurality of service components is a hierarchical storage device and said plurality of operations comprise operations internal to said storage device and operations occurring between said storage device and a host device and wherein said selecting comprises:
   selecting one of an operation internal to said storage device and an operation occurring between said storage device and said host device based on a utilization rate of said storage device.

6. The method of claim 1 wherein one of said plurality of service components is a hierarchical storage device and said plurality of operations comprise direct data transfer operations between a device external to said hierarchical storage device and combinations of said direct data transfer operations and migrations of data between different levels of said hierarchical storage device and wherein selecting comprises:
   selecting, for execution, one of a direct data transfer operation and said combination of a direct data transfer operation and a migration of data between different levels of said hierarchical storage device, based on a utilization rate of said hierarchical storage system.

7. The method of claim 6 wherein said selecting comprises:
   causing said hierarchical storage device to execute substantially only said direct data transfer operations when a utilization rate of said hierarchical storage device is below a predetermined threshold.

8. A system for providing adaptive performance optimization of a data processing system, the system comprising:
   at least one hierarchical storage device having a plurality of storage levels;
   a host device for conducting communication with said at least one hierarchical storage device;
   a priority manager for prioritizing work requests affecting data stored in said at least one hierarchical storage device during run time of said data processing system;
   a workload identifier for identifying each of a plurality of workloads
   a performance demand associated with each of said plurality of workloads, thereby establishing a plurality of performance demands;
   an initial priority ranking associated with each of said plurality of workloads, thereby establishing a plurality of initial priority rankings; and
   a ranking controller for adjusting at least one of said initial priority ranking in order to service a performance demand of at least one of said plurality of workloads.

9. The system of claim 8 further comprising:
   a request queue in communication with said priority manager for storing work requests incoming from at least one of said host device and said at least one hierarchical storage device.

10. The system of claim 9 wherein said stored work requests comprise:
    external work requests describing a data transfer operation between said at least one hierarchical storage device and said host device; and
    internal work requests describing a data transfer operation between different levels in said at least one hierarchical storage device.

11. The system of claim 9 further comprising:
    a utilization evaluator for calculating utilization rates of said at least one hierarchical storage device based upon said stored work requests in said request queue.

12. The system of claim 8 further comprising:
    a service level guarantee associated with one of said performance demand for establishing a minimum level of service for said one of said performance demand.

13. A computer program product having a computer readable medium having program logic recorded thereon for optimizing an operation of a hierarchical RAID (redundant array of independent disks) storage device included in a data processing system, the computer program product comprising:

code for transferring data blocks between said RAID storage device and a host device of said data processing system;

code for migrating selected data blocks between different levels of said RAID storage device;

code for determining, during run time of said data processing system, an order for executing said code for transferring and said code for migrating, said code for determining comprising code for determining service demand; and code for estimating a utilization rate for each RAID storage level based on determined service demand.

14. The computer program product of claim 13 further comprising:

code for establishing an initial priority for work requests from at least one of said code for transferring and said code for migrating, wherein said work requests from said code for transferring are transfer work requests and said work requests from said code for migrating are migrating work requests.

15. The computer program product of claim 14 further comprising:

code for determining a service demand imposed upon said RAID storage device based on said transfer work requests and said migrating work requests.

16. The computer program product of claim 15 further comprising:

code for modifying said established initial priority for said transfer work requests and said migrating work requests based upon said determined service demand.

17. The computer program product of claim 16 wherein said code for modifying comprises:

code for adjusting said established initial priority to substantially equalize utilization rates of at least two of said different RAID storage levels.

* * * * *

UNITED STATES PATENT AND TRADEMARK OFFICE
CERTIFICATE OF CORRECTION

| | |
|---|---|
| PATENT NO. | : 6,957,433 B2 |
| APPLICATION NO. | : 09/757269 |
| DATED | : October 18, 2005 |
| INVENTOR(S) | : David K. Umberger et al. |

Page 1 of 1

It is certified that error appears in the above-identified patent and that said Letters Patent is hereby corrected as shown below:

In column 1, line 26, after "relates" insert -- in general --.

In column 16, line 36, in Claim 8, after "workloads" insert -- ; --.

Signed and Sealed this

Twenty-seventh Day of July, 2010

David J. Kappos
*Director of the United States Patent and Trademark Office*